United States Patent [19]

Yoshizawa

[11] Patent Number: 4,841,510
[45] Date of Patent: Jun. 20, 1989

[54] OPTICAL CHARACTERISTIC MEASURING APPARATUS FOR AN OPTICAL RECORDING MEDIUM SUBSTRATE

[75] Inventor: Akihiko Yoshizawa, Hachioji, Japan

[73] Assignee: Olympus Optical Co., Ltd., Tokyo, Japan

[21] Appl. No.: 36,775

[22] Filed: Apr. 9, 1987

[30] Foreign Application Priority Data

Apr. 10, 1986 [JP] Japan .................. 61-82810

[51] Int. Cl.⁴ .......................... G11B 7/125
[52] U.S. Cl. ........................ 369/46; 369/54; 369/58; 369/110; 369/122
[58] Field of Search ............ 360/114; 369/44–46, 369/54, 58, 110, 122; 350/375, 401

[56] References Cited

U.S. PATENT DOCUMENTS

| | | |
|---|---|---|
| 3,742,952 | 4/1973 | Vossberg . |
| 3,969,573 | 7/1976 | Bouwhuis et al. .......... 369/110 |
| 4,037,929 | 7/1977 | Bricot et al. . |
| 4,053,232 | 10/1977 | Dill et al. . |
| 4,272,651 | 6/1981 | Yoshida et al. .......... 369/122 |
| 4,409,631 | 10/1983 | Matsumoto .......... 369/110 |
| 4,546,463 | 10/1985 | Opheij et al. .......... 369/110 |
| 4,551,733 | 11/1985 | Cornet et al. . |
| 4,558,440 | 12/1985 | Tomita .......... 369/110 |
| 4,561,032 | 12/1985 | Matsumoto et al. .......... 369/110 |
| 4,633,457 | 12/1986 | Yamamoto .......... 369/122 |
| 4,672,593 | 6/1987 | Ojima et al. .......... 369/110 |
| 4,682,311 | 7/1987 | Matsubayashi et al. .......... 369/110 |

FOREIGN PATENT DOCUMENTS 57-74701 11/1982 Japan .
8200393 2/1982 Netherlands .

OTHER PUBLICATIONS

"Measurement of the Thickness and Refractive Index of Very Thin Films and the Optical Properties of Surfaces by Ellipsometry": vol. 67A, No. 4, Jul.–Aug. 1963, Journal of Research of the National Bureau of Standards A. Physics and Chemistry.

Primary Examiner—Donald McElheny, Jr.
Attorney, Agent, or Firm—Armstrong, Nikaido, Marmelstein, Kubovcik & Murray

[57] ABSTRACT

A structure of an optical pickup. The optical pickup has a substrate used for an optical recording medium. The optical pickup is provided with a device for condensing and radiating a polarized light and a light-receiving device for receiving, through an analyzer set in a crossed Nicol state, the reflected light of this substrate or the above mentioned polarized light on the light transmitted side. The amount the C/N (carrier to noise ratio) is reduced or increased based on the substrate may be evaluated by the light amount received by the light receiving device.

10 Claims, 8 Drawing Sheets

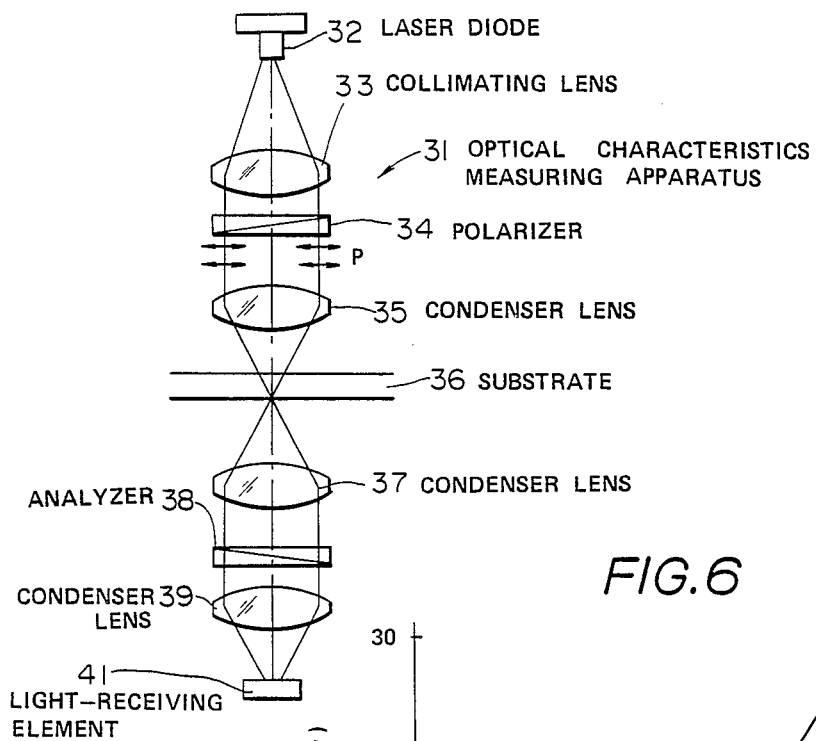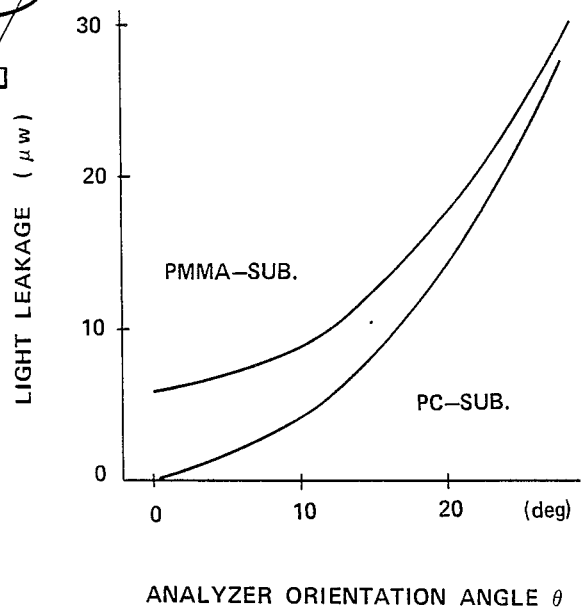

OPTICAL CHARACTERISTIC MEASURING APPARATUS FOR AN OPTICAL RECORDING MEDIUM SUBSTRATE

BACKGROUND OF THE INVENTION:

Field of the Invention and Related Art Statement

This invention relates to an apparatus for measuring the optical characteristics of a substrate for an optical recording medium adapted to investigate optical characteristics such as a light leakage to be suppressed in a crossed Nicol state set in a recording or reproducing optical system.

Recently, there has come to be noted an optical information recording and reproducing apparatus which can record information at a high density in an optical recording medium by condensing and projecting light beams onto the recording medium and can read out (reproduce) at a high speed the recorded information written in the recording medium by receiving, with a photodetector, the light returning from this recording medium.

The above mentioned recording medium is a photomagnetic disc in which is formed a magnetic recording layer wherein light beams passing through a substrate such as acryl resin as a PMMA, are condensed and projected onto this substrate and the polarized plane of the returning light rotates in response to the magnetizing direction of the part forming the recording layer or a photodisc in which information is recorded in pit rows which reflect light in different amounts.

As disclosed, for example, in the publication of Japanese Patent Laid Open No. 74701/1982, the above mentioned acryl resin has high optical characteristics but has a defect that it is as high in the hygroscopicity so that the recording medium surface will deflect.

Therefore, it is thought to be effective to use for a substrate a resin such as a polycarbonate (abbreviated as PC hereinafter) resin which is hard to deflect, high in form stability and also high in mechanical strength.

In using a resin such as the above mentioned PC resin for a substrate, it is necessary to know its optical characteristics. For example, in case its refractive index is large, the optical distance per unit thickness will become longer and therefore the thickness of the substrate can not be made too large. Therefore, it is particularly necessary to investigate the refractive index of the material to be used for the substrate and, as the refractive index may vary depending on the method of forming the substrate, it is desirable to measure the refractive index on the substrate form made by an actual molding method.

FIG. 1 shows a prior art example of an apparatus 1 for measuring a double refractive index for a substrate of a disc-shaped recording medium.

That is to say, a random polarized laser beam of an He-Ne laser 2 is made a predetermined linear polarized light beam by passing through a polarizer 3 such as a Glan-Thompson prism (abbreviated as GTP) and is then projected onto a substrate 4 as a medium to be measured. The light beam having passed through this substrate 4 passes through a phase compensating plate 5 of Babinet-Soleil arranged to be opposed to the above mentioned polarizer 3 with the substrate 4 held between them, then passes through an analyzer 6 such as a GTP set in an extinction position (crossed Nicol) so as to pass the polarized light intersecting at right angles with the above mentioned polarizer 3 and is received by a light receiving element 7. With the polarized beam incident upon the above mentioned substrate 4, if the substrate 4 is of a monoaxial (crystal) characteristic by which the optical axis is vertical to the substrate plane, even if the polarizer 3 is rotated to vary the polarizing direction, no phase difference (ellipticizing) will be produced in the substrate 4 but, in case the optical axis is within the substrate, a phase difference will be produced in response to the angle formed by the polarizing direction with the optical axis and, even in the case of a biaxial (crystal) characteristic, when the polarizing direction of the polarized beam is varied, a phase difference will be produced in the substrate. Therefore, of a left rotatory plate 5a and wedge-shaped right rotatory plates 5b of the phase compensating plate 5, for example, if the right rotatory members 5b are moved in the vertical direction (within the paper surface) to uniformly vary the thickness of the plate by the wedges and thereby the above mentioned phase difference is extinguished, the light passing through the analyzer 6 in the crossed Nicol state (extinction position state) for the polarizer 3 will be able to be extinguished and the signal output of the light receiving element 7 will become a minimum. The double refractive index within the plane of the substrate 4 can be measured from the displacement of the above mentioned phase compensating plate 5.

With the above mentioned conventional measuring method, the double refractive index in the thickness direction of the substrate can not be known at all. Therefore, in case it is used for the substrate of an optical recording medium, it will be insufficient. That is to say, in case the light is projected onto the recording layer through the substrate of the recording medium, a parallel light beam will be focused in the form of a spot and will be radiated, the light condensing angle or the number of apertures N.A. will be considerably large and the position of the substrate surface will be held in a defocused state and will be hard to be influenced by dust or the like. It shall be explained in the following that, when the light beam is thus condensed, in case the substrate is of an optical material showing a double refraction, the refractive index in the thickness direction will influence the light beam passing through the substrate.

In case an injection-molded PC plate is used for the above mentioned substrate, this substrate will show double refraction such as of a monoaxial crystal and will have an optical axis in the direction vertical to the substrate plane in most cases. The refractive index (no) for the normal ray and refractive index (ne) for the abnormal ray are different from each other.

Therefore, the linear polarized light incident upon this substrate as inclined to the optical axis (the direction vertical to the substrate plane) will produce a phase difference due to the double refraction unless the angle formed by the incident plane with the polarizing direction is a specific angle and, as a result, an ellipticization (a linear polarized light becoming an elliptic polarized light) will be produced.

FIG. 2 is an explanatory view showing the manner of throttling a laser beam 14 into a part of a substrate 12 forming a disc 11 of an objective so as to be radiated in the form of a spot. In the drawing, only a part of the disc 11 is shown.

The laser beam 14 is a linear polarized light whose polarizing direction intersects at right angles with the radial direction 16 of the substrate 12 as indicated by the arrow 15 and includes a beam portion (S polarized light) 21 incident vertically to the polarizing direction, a beam portion (P polarized light) 22 incident parallelly with the polarizing direction and beam portions 23 and 24 incident as inclined, for example, by 45 degrees respectively to these beam portions 21 and 22. These beam portions 23 and 24 become a polarized light including both components of S polarized light and P polarized light.

On the other hand, the refractive indices for the S polarized light and P polarized light incident upon the substrate 12 as inclined by an angle $\theta i$ to the optical axis (direction vertical to the substrate plane) indicated by the arrow 12a in FIG. 2 are determined as in the following.

FIG. 3 is an explanatory view showing the relation between the incident angle $\theta i$ and refractive index of the light incident upon the substrate 12. As described above, the injection-molded PC substrate 12 shows a substantially monoaxially crystalline characteristic and two of the main refractive indices $n_1$, $n_2$ and $n_3$ are equal. Therefore, if a refractive index ellipsoid is indicated by selecting coordinate axes so that $n_1=n_2$ and the Z axis direction may be $n_3$, the optical axis 12a will coincide with the Z axis.

Here, the refractive index n′ for the S polarized light incident as inclined by the angle $\theta i$ to the optical axis (direction verical to the substrate plane) 12 and the refractive index n″ for the P polarized light are represented respectively by the short axis 26a and long axis 26b of the vertically cut section (ellipse 26) of the light 25 after the incidence. That is to say, if the angle made by the light 25 after the incidentce with the optical axis 12a is represented by $\theta t$, $$n' = n_1 \quad (1)$$

$$n'' = n_1 \sqrt{n_3/n_1^2 \sin^2\theta t + n_3^2 \cos\theta t} \quad (2)$$

Here, $$\sin \theta t = (1/n') \sin \theta i$$

Therefore, the beam portion 21 of the S polarized light incident upon this substrate 12 and the beam portion 22 of the P polarized light remain linear polarized light but, for example, the beam portions 23 and 24 incident as inclined by 45 degrees to the above mentioned beam portions 21 and 22 are polarized light including both components of the S polarized light and P polarized light. Therefore a phase difference will be produced between the S polarized light component and P polarized light component and the linear polarized light will become elliptic polarized light. If the thickness of the substrate 12 is represented by d and the wave length of the laser beam is represented by $\lambda$, this phase difference $\delta_{s-p}$ will be represented by $$\delta_{s-p} = (2\pi/\lambda) \times (n' - n'') \times (d/\cos \theta t) \quad (3)$$

Therefore, the larger the thickness d and incident angle $\theta i$ of the substrate, the larger the phase differene $\delta_{s-p}$.

FIG. 4 is a sectioned view of a beam which was incident upon the objective by the linear polarized light whose polarizing direction is represented by the reference numeral 27, was reflected by the disc 11 and again passed through the objective. The nearer to the peripheral edge side of the beam, that is, the larger the opening, the larger the beam incident upon the substrate 12 in the incident angle $\theta i$ and phase difference $\delta_{s-p}$. Where the orientation angle (the angle made by the polarizing direction with the incident angle) corresponds to 45 degrees (that is, such as 45 and 135 degrees), that is, at the reference numerals 28a, 28b, 28c and 28d, the ellipticization is a maximum.

Thus, in case the substrate 12 shows a double refraction, even if the double refraction is of a monoaxial characteristic, by the refractive index for the thickness direction, the linear polarized light will become an elliptic light having a polarized component at right angles with the linear polarizing direction.

Therefore, in case the substrate is used as a substrate, for example, for a photomagnetic disc, when a linear polarized light is radiated, the polarizing direction of the returning light will be rotated by a minute angle in response to the direction of magnetization but, even if an analyzer is set to transmit only the rotated polarized light component, the light beam having passed through the substrate will be ellipticized and therefore other light beams than the inherent signal component will also pass through this analyzer and these leaking lights will mix in with the signal. Also, there will be produced a signal component intercepted by the analyzer due to the ellipticization. Therefore, the C/N (carrier to noise ratio) will be reduced.

There is extensively used an optical system wherein, in case the substrate is used not only as a substrate for a photomagnetic disc but also as a substrate for a photodisc in which recorded information is reproduced from the difference in the reflected light amount, a light beam obtained by making a linear polarized light pass through a polarized beam splitter, a circular polarized light by using a $\lambda/4$-plate is radiated, this returning light is again made a linear polarized light in the polarizing direction intersecting at right angles with the above mentioned linear polarizing direction by the $\lambda/4$ plate and this linear polarized light is efficiently branched on the information photodetector side by the above mentioned polarized beam splitter. In such a case, too, the substrate (having a value different from the refractive index in the substrate plane direction) will be made elliptic due to the refractive index in the thickness direction, the light will not be efficiently branched and the C/N value will be reduced.

As the ellipticization by the above mentioned double refraction is different in the respective positions of the circular light beam, it is necessary to evaluate to what extent the C/N is influenced in the actual used condition. In such a case, the C/N can be evaluated in principle by determining the refractive index in the thickness direction but the influence is different depending on the incident angle and the like. In case the condition in the evaluation is different from the actual used condition, in the case of applying it to the actual used condition, the quantitative determination will be difficult. Therefore, if there is a simple means of evaluating the C/N in the state approximating the actual used condition, it will be very convenient.

OBJECTS AND SUMMARY OF THE INVENTION

An object of the present invention is to provide an optical characteristic measuring apparatus for an optical recording medium substrate whereby the C/N (carrier to noise ratio) caused by the substrate can be evaluated.

Another object of the present invention is to provide an optical characteristic measuring apparatus for an optical recording medium substrate whereby the C/N caused by the substrate can be easily measured in the state approximating the actual used condition.

In the present invention, a substrate used for an optical recording medium is provided with a device for condensing and radiating a polarized light and a light receiving device receives, through an analyzer set in a crossed Nicol state, the reflected light of this substrate, or the above mentioned polarized light on the light transmitting side, so that the reduction amount of the C/N based on the substrate may be presumed by the light amount received by the light receiving device.

BRIEF DESCRIPTION OF THE DRAWINGS

FIGS. 5 and 6 relate to the first embodiment of the present invention.

FIG. 5 is a formation view showing a measuring apparatus of the first embodiment.

FIG. 6 is a graph showing the results measured in the first embodiment.

DESCRIPTION OF THE PREFERRED EMBODIMENTS

Figure 1:
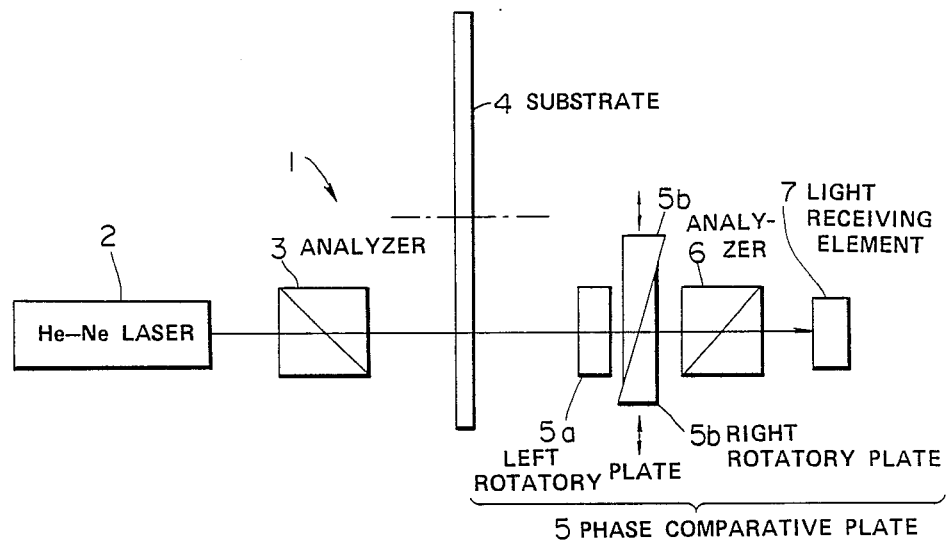
FIG. 1 is a formation view showing a prior art example.
Figure 2:
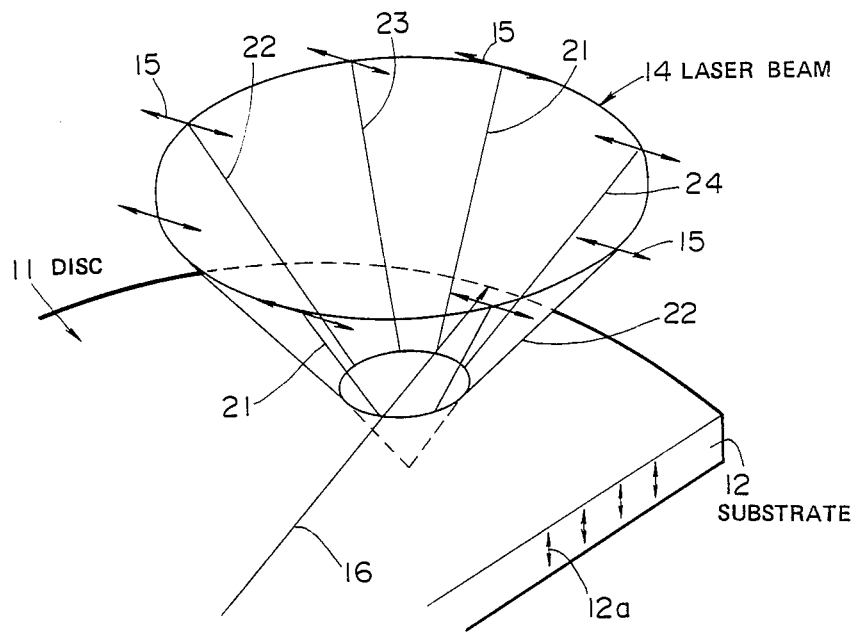
FIG. 2 is an explanatory view showing the manner of a light beam as condensed on a substrate.
Figure 3:
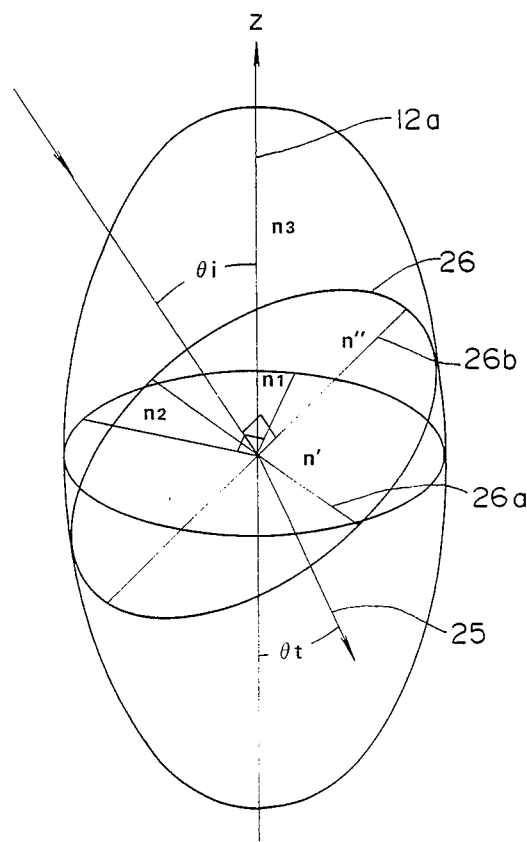
FIG. 3 is an explanatory view showing the relation between the incident angle and refractive index of a light incident upon a substrate.
Figure 4:
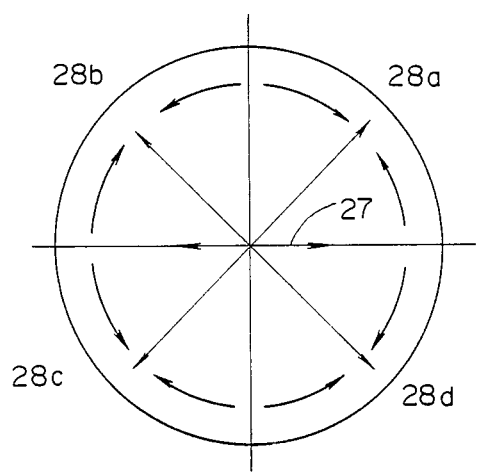
FIG. 4 is an explanatory view showing the relation between the position in the section and the degree of the elliptic polarization of a beam reflected by a disc and then transmitted through an objective.

As shown in FIG. 5, in a substrate optical characteristic measuring apparatus 31 of the first embodiment, a laser light beam of a laser diode 32 is made into a parallel light beam by a collimating lens 33. A polarizer 34 makes the parallel light beam into a linear polarized light in which the direction parallel, for example, with the paper surface of FIG. 1 is a polarizing direction P. The light beam in this polarizing direction P is condensed by a condenser lens 35 and is projected onto a substrate 36 whose optical characteristics are to be measured. The light beam having passed through the substrate is again made into a parallel light beam by a condenser lens 37 arranged so that the distance from the focus position may be its focal distance. This parallel light beam is incident upon an analyzer 38 set in a crossed Nicol state so as to pass only the polarized light component in the polarizing direction intersecting at right angles with the above mentioned polarizer 34. The light having passed through this analyzer 38 is condensed by a condenser lens 39 and is received by a light receiving element 41.

In case the substrate 36, to be measured by the above mentioned measuring apparatus 31, shows an optically isotropic refractive index, that is, in case the refractive indices in three directions are all equal, the light passing through the analyzer 38 in a crossed Nicol state for the polarizer 34 will be substantailly zero.

On the other hand, in case the refractive index, for example, in the thickness direction of the substrate 36 to be measured, is different from the refractive indices in the respective directions within the substrate, when the light passes through the substrate, as described above, the light will be ellipticized in response to the difference from the different respective indices. Therefore, in this case, a polarized light component (also referred to as light leakage) passing through the analyzer 38 in the crossed Nicol state, will be present and the photoelectric conversion output of the light receiving element 41 will become large in proportion to the passing light amount.

Therefore, by measuring the output level of the above mentioned light receiving element 41, the amount of influence on the C/N (carrier to noise ratio) in the case of using the substrate 36 as a substrate for a recording medium can be presumed.

That is to say, in case the light leakage received by the light receiving element 41 in the above mentioned crossed Nicol state is small enough, the reduction of the C/N in the case of using it as a substrate for a recording medium will be small. Thus, it can be presumed that the substrate is adapted to be used as a substrate for a recording medium.

On the other hand, in case the light leakage received by the light receiving element 41 in the crossed Nicol state is large, the reduction of the C/N will be so large that the substrate will not be able to be presumed to be adapted to be used as a substrate for a receiving medium.

FIG. 6 shows the measured results measured on a PC substrate and PMMA substrate by the above mentioned apparatus 31.

The measuring conditions in FIG. 6 are that the laser power is set at 1 mW on the substrate plane and the orientation angle $\theta$ of the analyzer 38 is varied from the crossed Nicol state (orientation angle $\theta=0$). The light leakage (in $\mu W$) received by the light receiving element 41 in such a case is indicated on the ordinate. For example, in case the orientation angle is 0°, the light leakage will be 5.9 ($\mu W$) in the PC substrate but will be 0.43 ($\mu W$) in the PMMA substrate. Thus, optically the PMMA substrate is more adaptable.

When the orientation angle $\theta$ deviates from 0°, in the case of both substrates, the light leakage received by the light receiving element 41 will quickly increase.

If the light leakage is large, the C/N will be reduce. Therefore, whether the substrate is adaptable or not as a substrate for a recording medium can be simply determined from the size of the light leakage.

Figure 7:
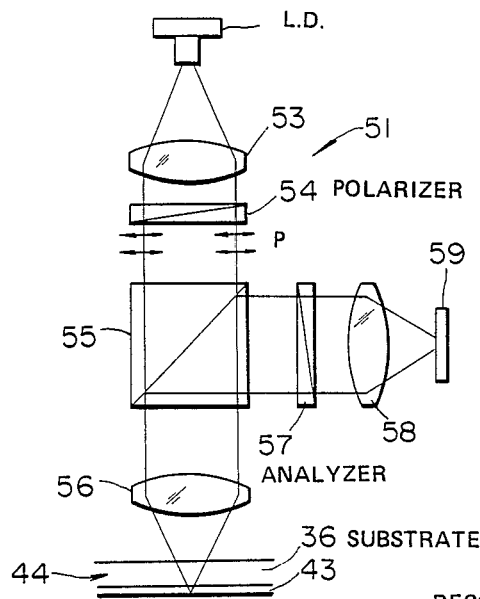
FIG. 7 is a formation view of the second embodiment of the present invention.

The above mentioned determination is thought to be generally applicable but the C/N was measured under an actual used condition such as is shown in FIG. 7 by using a recording medium 44 in which a recording film 43 is formed below the substrate 36 so as to make the conclusion more positive.

In a noise level measuring apparatus 51 shown in FIG. 7, the laser light beam of a laser diode 52 is made into a parallel light beam by a collimating lens 53 and a linear polarized light in a polarizing direction P parallel, for example, with the paper surface is passed through a polarizer 54. A part of this linear polarized light passes through a half mirror 55 and is condensed by an objective 56, passes through the substrate 36 and is condensed and projected in a focused strate onto the recording film 43 (such as a reflecting film for a recording film of a photodisc)

The light reflected by this recording film 43 is again made a parallel light beam by the objective 56 and is partly reflected by the half mirror 55. The light reflected by this half mirror 55 is incident upon the above mentioned polarizer 54 and the analyzer 57 set in the crossed Nicol state. The light having passed through the analyzer 57 is condensed by a condenser lens 58 and is received by a light receiving element 59.

By the noise level measuring apparatus 51 (of the second embodiment) shown in FIG. 7, the respective noise levels were measured in the case of a recording medium provided with a recording film below a PMMA substrate having high optical characteristics and in the case of a recording medium provided with a recording film below a PC substrate having lower optical characteristic than PMMA substrate. The measured results are shown in FIG. 8.

These measured results show qualitatively the same results as the measured results of the light leakage in FIG. 6. That is to say, the noise level in the case of using the PMMA substrate is considerably lower than the noise level in the case of using the PC substrate.

Figure 8:
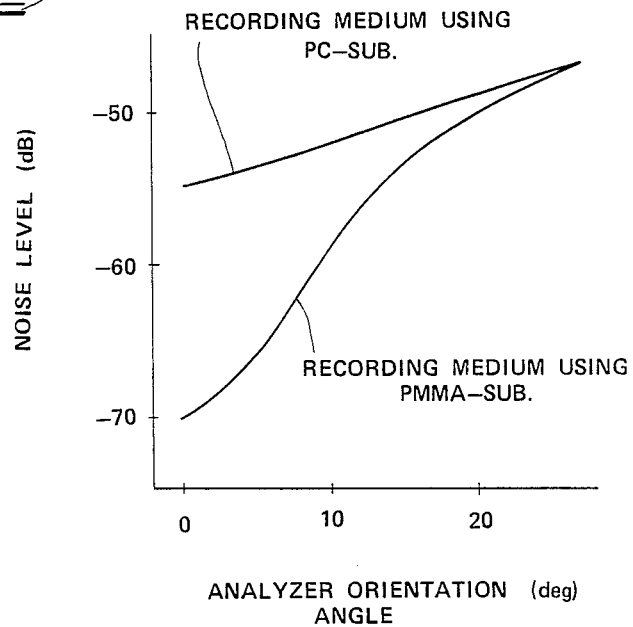
FIG. 8 is a graph showing the results measured with the measuring apparatus in FIG. 7.
Figure 9:
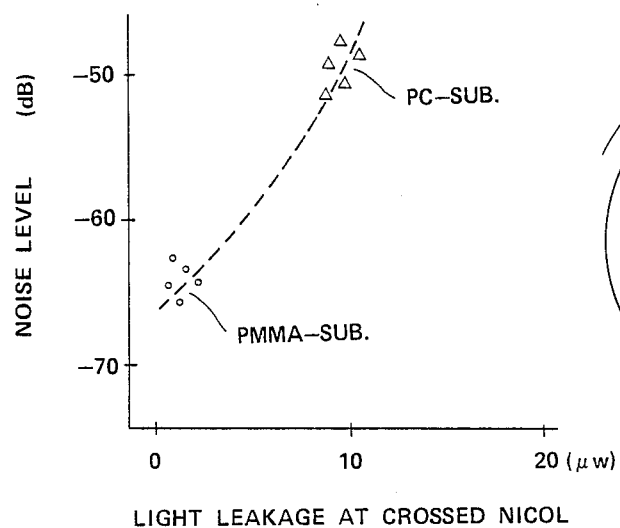
FIG. 9 is a graph showing the relation between the light leakage and noise level obtained from the measured results in FIGS. 6 and 8.

If the above mentioned measured results in the crossed Nicol state in FIGS. 6 and 8 are indicated in a correlative graph in which the light leakage is represented on the abscissa and the noise level is represented on the ordinate, they will be as in FIG. 9.

In FIG. 9, because there are produced some fluctuations in the case of forming the recording film below the substrate and there are some fluctuations in the formed substrate itself, the plotting positions in the PC substrate and PMMA substrate may somewhat fluctuate.

However, FIG. 9 shows that the light leakage and C/N are in a definite correlation, that, if the light leakage is large, the C/N will reduce and that, if the light leakage is small, the C/N will be large. Further, in case the measured value of the light leakage is known, the noise level when using the recording medium by forming a recording film below the substrate can be determined.

On the other hand, the results of measuring in the respective radius positions the retardations (phase delays) for the PMMA and PC substrates in the prior art example shown in FIG. 1 are shown in the table for comparison. The measured values in this table represent the phase delays caused by the double refractions within the substrate plane in case the light beam is incident vertically upon the substrate 36 plane as described above but do not represent the influences of the double refractions in the thickness direction in case the beam is condensed and transmitted. Therefore, the influences on the C/N can not be presumed from these measured values.

TABLE

| Radius (in mm) | Retardation (in nm) | |
|---|---|---|
| | PMMA Substrate | PC Substrate |
| 30 | 3 | −14 |
| 40 | 0 | 12 |
| 50 | 2 | 10 |
| 60 | 8 | 20 |

On the other hand, if the light leakage merely in the crossed Nicol state is measured with the optical characteristic measuring apparatus 31 by measuring the light leakage as shown in FIG. 5, the C/N caused by the substrate in the case that the substrate used for the measurement is used for a recording medium substrate will be able to be presumed from the measured values. Also, the optical characteristics relating to the C/N of the substrate can be determined more easily than in the case of measuring the refractive index in the thickness direction.

Figure 10:
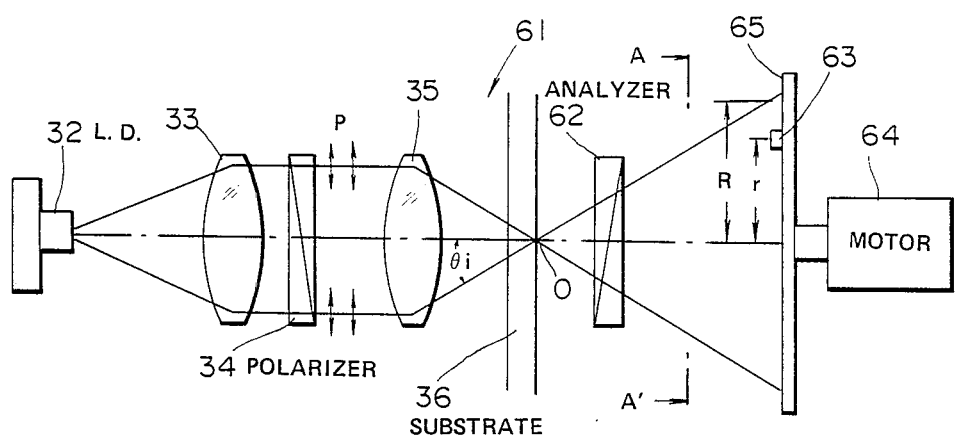
FIG. 10 is a formation view showing the formation of the third embodiment of the present invention.

FIG. 10 shows the third embodiment of the present invention. The optical characteristic measuring apparatus 61 of this third embodiment is the measuring apparatus 31 shown in FIG. 5 wherein an analyzer 62 is arranged on the light transmitting side of the substrate 36 so that the light transmitted through this analyzer 62 may be received by a light receiving element 63.

Figure 11:
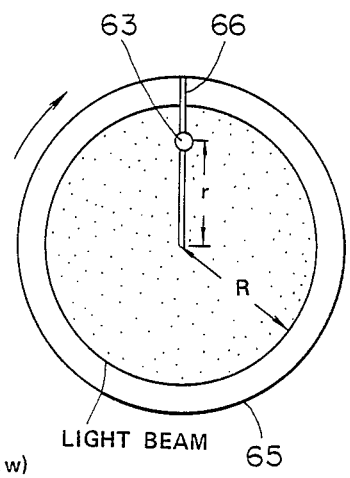
FIG. 11 is a magnified view on line A—A' in FIG. 10.

The above mentioned analyzer 62 is set in a crossed Nicol state for the polarizer 34. The light receiving element 63 is made movable in the radial direction intersecting at right angles with the optical axis in the position wherein the radius of the expansion of the light beam expanding through the analyzer 62 becomes R and is made rotatable. For example, the light receiving element 63 is fitted to a disc 65 rotated and driven by a motor 64, is made movable along a groove 66 (See FIG. 11) in the radial direction of the disc 65 and can be fixed in any position in the radial direction with a set screw or the like. The rotary shaft of the motor 64 is aligned with the center of the light beam, that is, with the optical axis.

In this embodiment, the light leakage for the entire light beam in the case that the light beam is condensed by the condenser lens 35 and is passed through the substrate 36 is not to be measured but to what extend the light leakage is produced for each incident angle can be measured.

That is to say, to what extent the leaking light beam will be produced for the incident angle, for example, of $\theta$ to $\theta + \Delta\theta$ in case the maximum incident angle on the substrate 36 in FIG. 10 is made $\theta_1$ can be measured.

Figure 12:
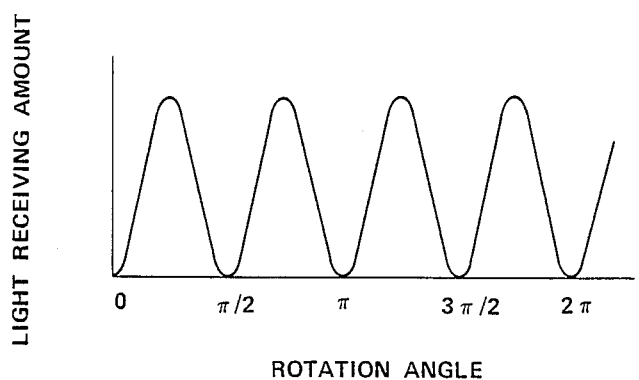
FIG. 12 is a characteristic graph showing the results measured with the measuring apparatus shown in FIG. 10.

The light receiving element 63 is moved in the radial direction and is fixed to the disc 65 so that the light receiving surface may be in a position r wherein an angle $\theta$ is made with the optical axis in the focus position 0. The output received by the light receiving element 63 by rotating the motor 64 to be photoelectrically converted is indicated in a plotter or the like. The measured results in this case are as in FIG. 12.

Here, the abscissa represents angles of rotation wherein the position in which the light receiving element 63 is within the paper surface, for example, in FIG. 10 is made 0. From the measured results in FIG. 12, it is found that the substrate 36 used in this measurement is a member showing a double refraction having substantially no light leakage at such predetermined angles as of 0, $\pi/2$, $\pi$ and $3/2\cdot\pi$. If this output varying in the form of sine waves is integrated over the angles of 0 to 2, the magnitude of the light leakage at such incident angle will be able to be known. In case the same measurement is made by changing the position of the above mentioned light receiving element 63, for example, the same as in FIG. 12, the received light amount becomes substantially zero at the respective angles of 0, $\pi/2$, $\pi$ and $3\pi/2$ and becomes a peak meanwhile and the higher the radial position (of the light receiving element 63), the larger the peak value, the influence of the double refraction produced by the difference from the refractive index in the thickness direction will be large. In such a case, it is desirable for the comparison to equalize the light amounts of the respective annular light beams used in the measurement. (For example, if the light is received by the light receiving element 63 with the substrate 36 and analyzer 62 deviated from the light path, the light amount to be used for the measurement can be determined.)

Figure 13:
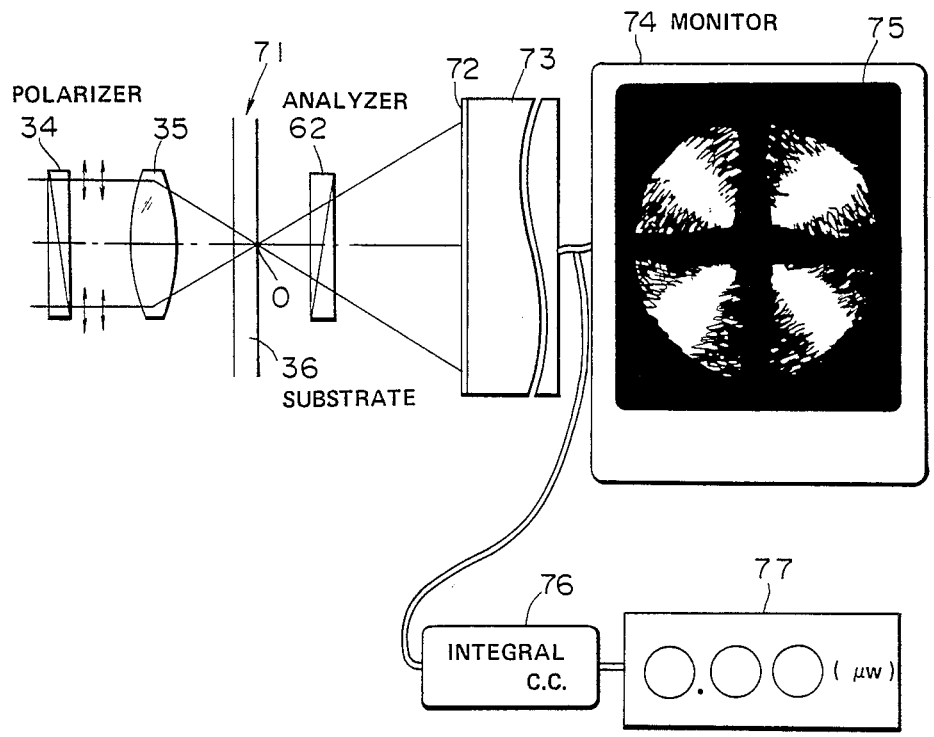
FIG. 13 is a formation view showing the fourth embodiment of the present invention.

FIG. 13 shows the fourth embodiment of the present invention.

The measuring apparatus 71 of this fourth embodiment is the above mentioned third embodiment shown in FIG. 10 wherein a translucent screen 72, such as a frosted glass plate, is arranged in the position of the light receiving element 63 receiving the light leakage or any other position so that the light amount distribution image formed on this translucent screen 72 may be imaged by an imaging means (or light receiving means) having a light receiving surface (imaging surface) on which a light receiving element is two-dimensionally arranged such as a video camera (using a contact photographing lens as required) and may be displayed on a picture surface 75 of a monitor 74.

In such a case, the measured results measured, for example, for the PC substrate will be as illustrated.

The video signal received by the above mentioned video camera 73 and amplified by a preamplifier is passed through an integrating circuit 76 integrating it for one frame period and is put into a received light amount indicating meter 77 so that all the light leakage may be measured. The integrating circuit 76 is reset every frame period by an imaging clock signal, for example, of the video camera 73 or holds a sample for one frame period until it is reset and puts it out on the digital indicating meter 77 side.

Figure 16:
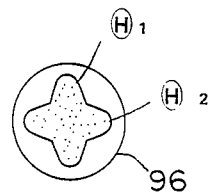
FIG. 16 is an explanatory view showing the shape of a light beam as seen in the direction of line D—D' in FIG. 14.

In the case of the substrate 36 showing a light leakage pattern such as is shown in the above mentioned FIG. 13, when this substrate 36 is to be used as a substrate for a recording medium, it will be found to be favorable to set the energy density of the light beam used for recording, reproduction or controlling to be high in the angular directions in which the light leakage becomes minimum in FIG. 13 (in the vertical direction $\theta_1$ and horizontal direction $\theta_2$ in FIG. 13). Therefore, an optical pickup 81 of a structure such as is shown in FIG. 14 may be formed so that light beam such as is shown in FIG. 16 wherein the light beam density is made large in the directions $\theta_1$ and $\theta_2$ may be projected onto a disc 82 for reproduction.

Figure 15A:
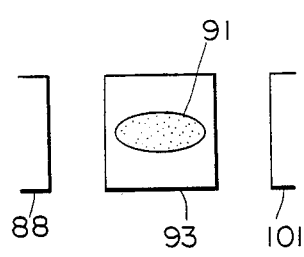
FIG. 15 is an explanatory view showing the shapes of a light beam as seen in the directions of lines B—B' and C—C' in FIG. 14.
Figure 15B:
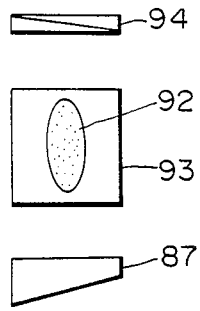

In the above mentioned optical pickup 81, the light beams from the first and second laser diodes 83 and 84 are made parallel light beams respectively by collimating lenses 85 and 86, are incident respectively upon shaping prisms 87 and 88 and are shaped respectively to be elliptic beams 91 and 92 such as are shown respectively in FIGS. 15a and 15b. The respective elliptic beams 91 and 92 pass through a half mirror 93, then have only the linear polarized light P′ component parallel, for example, with the paper surface passed through a polarizer 94, pass through a half mirror 95, are condensed by an objective 96 and are projected onto a photomagnetic disc 82. A substrate 82A forming this photomagnetic disc 82 is formed of the substrate 36 showing a pattern such as is shown, for example, in FIG. 13. The light beam of the combination of the elliptic beams 91 and 92, that is, the light beam before being condensed by the objective 96 is a light beam in which the energy density is large in the crossed directions Ⓗ$_1$ and Ⓗ$_2$ are made to coincide respectively with the directions $\theta_1$ and $\theta_2$ in which the light leakage in the substrate 82A becomes minimum.

The light reflected by the magnetic recording film 82B of the above mentioned disc 82 is condensed by the objective 96 to be a substantially parallel beam and is partly reflected by the half mirror 95. This reflected light is further divided by a half mirror 97 to be a reflected light and a transmitted light. The transmitted light is received by a light receiving element 99 through an analyzer 98 set to transmit the reflected light corresponding to one magnetizing direction in the recording film 82B. The reflected light passes through a critical angle prism 101 and is then received by a controlling light receiving element 102. This controlling light receiving element 102 is formed, for example, of a four-divided light receiving element and produces a focus controlling signal and tracking controlling signal with the differential output of each pair. These respective controlling signals are applied respectively on a focus coil 103 and tracking coil 104 forming a lens actuator so as to be able to be held respectively in a focus state and tracking state.

Figure 14:
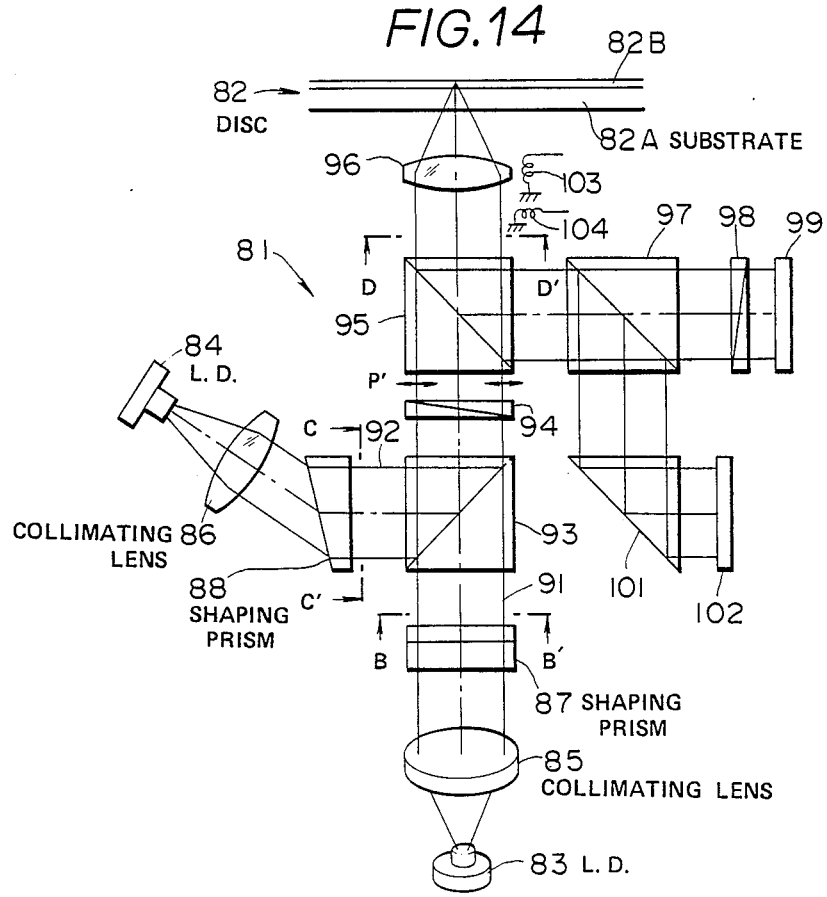
FIG. 14 is a formation view showing an example of optical pickup of a photomagnetic system in which the C/N is anticipated to be improved from the measured results of the measuring apparatus in FIG. 13.

When an optical pickup 81 such as is shown in FIG. 14 is used to condense and project a light beam in which the energy density becomes high in the direction in which the light leakage in the substrate 82A becomes minimum to make recording or reproduction (particularly in the case of reproduction), the reduction of the C/N by the light leakage will be able to be effectively prevented.

The optical pickup 81 shown in the above mentioned FIG. 14 is derived from the measuring pattern in FIG. 13. Therefore, when the measuring pattern shown in FIG. 13 is different, for example, in the picture surface indicated in FIG. 13, in case the light leakage in the peripheral direction of the direction angle wider than in the direction of the angle of the other direction $\theta_2$, if a light beam of a form such as an elliptic form in which the energy density of the light beam becomes large in that direction is used, it will be found to be effective to prevent the reduction of the C/N.

Figure 17:
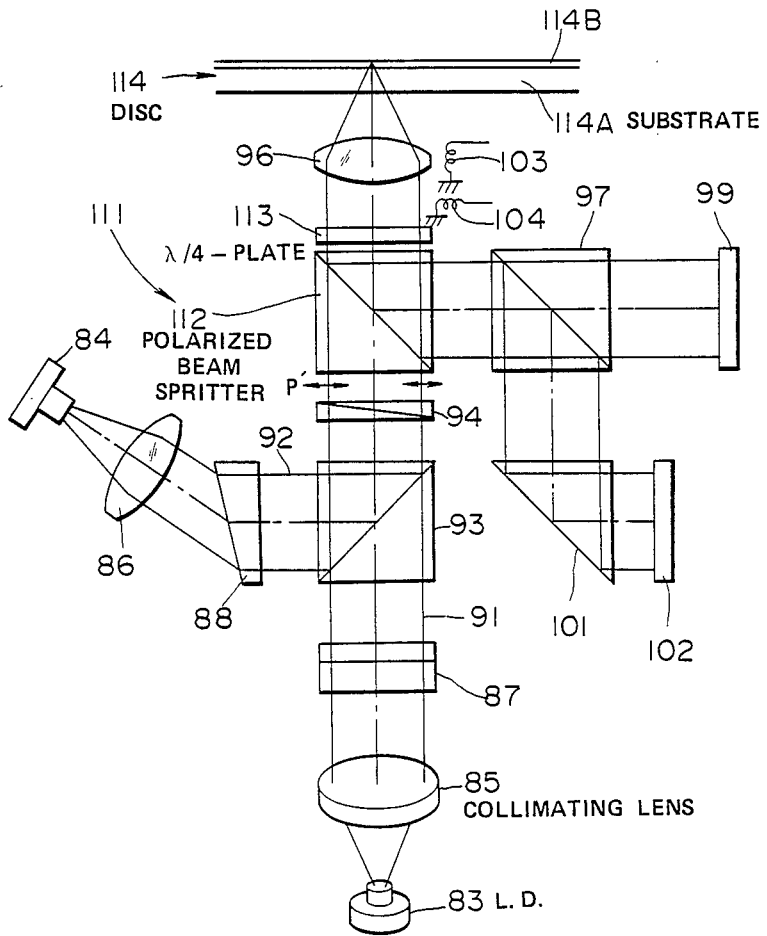
FIG. 17 is a formation view showing an example of optical pickup for a photodisc in which the C/N is anticipated to be able to be improved from the measured results of the measuring apparatus in FIG. 13.

FIG. 14 is of the optical pickup 81 as applied to the photomagnetic disc 82. The optical pickup 81 can be applied likewise to an optical disc. In such a case, the structure may be as shown in FIG. 17. In an optical pickup 111 in this case, in FIG. 14, a polarizing beam splitter 112 is used instead of the half mirror 95 and a $\lambda/4$-plate 113 is interposed between this polarizing beam splitter 112 and objective 96. The light reflected by a recording film 114B of a photodisc 114 passes through a substrate 114A and is again incident upon the polarizing beam splitter 112. This returning light is reflected by the polarizing beam splitter 112 and advances to the half mirror 97 side. The light having passed through this half mirror 97 is received by the light receiving element 99 without passing through the analyzer 98. The others are substantially the same as are shown in FIG. 14.

In FIG. 14 or 17, in case the light beams of the laser diodes 83 and 84 are polarized, without using the polarizer, the direction of the laser diodes can be adjusted to be set in a predetermined polarizing direction. Also, without using the shaping prisms 87 and 88, the light beam forms of the laser diodes themselves can be utilized. As required, the polarizing direction can be changed by using λ/2-plate.

For example, in FIG. 7, without providing the recording film 43, the reflecting film 43 may be arranged below the substrate 36 for the measurement.

Further, for example, in the measuring apparatus in FIG. 5, the optical system on the transmitted light side can be made of a focus controllable structure. In such a case, the degree of the double refraction based on the refractive index in the thickness direction can be determined from the displacement based on the focus error signal between the case of arranging no substrate and the case of arranging the substrate to condense and transmit the light beam. Also, in such a case, when the light beam form is varied as by shielding a part of the beam, the influence amount of the double refraction can be presumed by the difference or the degree of the difference of the minimum value of the focus error signal.

In the case of obtaining the focus error signal, for example, a half mirror may be arranged between the condenser lens 37 and analyzer 38 in FIG. 1 so that the light divided by this half mirror may be received by the two-divided light receiving element through the critical angle prism.

A different embodiment may be formed by combining the above described respective embodiments.

As described above, according to the present invention, as a polarized light beam is condensed and projected onto a substrate and its reflected light or transmitted light is received through an analyzer set in an extinction position, the optical characteristics of the substrate can be measured under the conditions similar to the actual used state.

What is claimed is:

1. An optical characteristic measuring apparatus for measuring a carrier to noise ratio of an optical recording medium substrate comprising:
   a linear polarized light producing means for producing a linear polarized parallel light beam;
   a condenser lens system receiving said linear polarized parallel light beam, condensing said linear polarized parallel light beam and projecting a condensed light toward said optical recording medium substrate;
   an analyzer arranged on one side of said optical recording medium substrate, said analyzer being in a crossed Nicol state for transmitting only a polarized light component, said polarized light component being polarized in an orthogonal direction to said linear polarized parallel light beam from said linear polarized light producing means; and
   a light receiving means for receiving the polarized light component transmitted by said analyzer wherein a carrier to noise ratio of said optical recording medium substrate can be evaluated by determining an amount of polarized light component received by said light receiving means.

2. An optical characteristic measuring apparatus according to claim 1 wherein said polarized light component received by said light receiving means is a part of either one of a reflected or a transmitted light beam from said optical recording medium substrate.

3. An optical characteristic measuring apparatus according to claim 1 wherein said polarized light component received by said light received means is all of either one of a reflected or a transmitted light beam of said optical recording medium substrate.

4. An optical characteristic measuring apparatus according to claim 2 wherein said light receiving means is to be rotated and driven around a center axis of the light beam from said optical recording medium substrate by a rotating and driving means.

5. An optical characteristic measuring apparatus according to claim 3 wherein said light receiving means consists of a two-dimensionally arranged light receiving element.

6. An optical characteristic measuring apparatus according to claim 5 wherein a photoelectric converted output of said light receiving means consisting of the two-dimensionally arranged light receiving element is two-dimensionally displayed on a picture surface of a monitor.

7. A photomagnetic pickup which minimizes a carrier to noise ratio of an optical recording medium comprising:
   a linear polarized light producing means for producing a parallel light beam of a linear polarized light;
   a light beam shaping means for receiving and shaping the parallel light beam of said linear polarized light, said parallel light beam being shaped to be a light beam with an oval cross section in which at least one of the directions parallel with the polarized light direction and intersecting at right angles with the polarized light direction is a long axis;
   an objective, condensing and projecting the light beam transmitted through said light beam shaping means onto said optical recording medium;
   a light beam branching means located between said light beam shaping means and said objective, said light beam branching means for branching part of the light beam transmitted through said light beam shaping means into the light beam transmitted to said objective and for branching a part of a light beam from said optical recording medium which is returned through said objective;
   an analyzer transmitting the part of the light beam from the optical recording medium which is returned through said objective after being branched by said light beam branching means, said part of the light beam being one magnetizing direction of the optical recording medium;
   a light receiving means for receiving the light beam transmitted through said analyzer;
   a focusing means connected to said light receiving means and said objective, said focusing means for holding said objective as focused based upon the amount of light received by said light receiving means; and a tracking means connected to said light receiving means and said objective, said tracking means for tracking the light beam condensed by said objective along a predetermined track based upon the amount of light received by said light receiving means.

8. A pickup according to claim 7 wherein said focusing means is a critical angle prism.

9. A photodisc pickup which minimizes a carrier to noise ratio of an optical recording medium comprising:
a linear polarized light producing means for producing a parallel light beam of a linear polarized light;
a light beam shaping means for receiving and shaping the parallel light beam of said linear polarized light, said parallel light beam being shaped to be a light with an oval cross section in which the direction parallel with the polarized light direction or intersecting at right angles with the polarized light direction is a long axis;
an objective, condensing and projecting the light beam transmitted through said light beam shaping means onto said optical recording medium;
a polarized light beam branching means located between said light beam shaping means and said objective, said light beam branching means for branching part of the light beam transmitted through said light beam shaping means into the light beam transmitted to said objective and for branching part of a light beam from said optical recording medium which is returned through said objective;
a ¼-wavelength plate interposed between said light beam branching means and said objective;
a light receiving means for receiving the part of the light beam from the optical recording medium which is returned through said objective after being branched by said light beam branching means;
a focusing means connected to said objective and said light receiving means, said focusing means for holding said objective as focused based upon an amount of light received by said light receiving means; and
a tracking means connected to said objective and said light receiving means, said tracking means for tracking the light beam condensed by said objective along a predetermined track based upon an amount of light received by said light receiving means.

10. A photodisc pickup according to claim 9 wherein said focusing means is a critical angle prism.

* * * * *